United States Patent [19]

Kataoka et al.

[11] Patent Number: 4,823,155
[45] Date of Patent: Apr. 18, 1989

[54] INSTANT CAMERA WITH SPRING-URGED PRESSURE PLATE

[75] Inventors: Hideaki Kataoka; Ashita Murai; Akira Haishi, all of Tokyo, Japan

[73] Assignee: Fuji Photo Film Co., Ltd., Tokyo, Japan

[21] Appl. No.: 173,531

[22] Filed: Mar. 25, 1988

[30] Foreign Application Priority Data

Mar. 25, 1987 [JP] Japan .............................. 62-44001[U]

[51] Int. Cl.⁴ .............................................. G03B 17/52
[52] U.S. Cl. ....................................... 354/86; 354/288
[58] Field of Search ........................... 354/85, 86, 288

[56] References Cited

U.S. PATENT DOCUMENTS 4,201,457  5/1980  Erlichman .............................. 354/86

Primary Examiner—Michael L. Gellner
Attorney, Agent, or Firm—Young & Thompson

[57] ABSTRACT

An instant camera equipped with a pressure plate for pressing against a stack of instant film units contained in a film pack to press the foremost film unit against the exposure opening frame of the film pack so as to place and hold that foremost film unit flat in the focal plane of the taking lens. A pressure relieving mechanism relieves pressure from the stack of instant film units at a predetermined time, so as to allow the foremost instant film unit to be withdrawn with reduced friction force from the film pack. To do this, the pressure relieving mechanism temporarily presses rearwardly against the pressure plate.

4 Claims, 2 Drawing Sheets

INSTANT CAMERA WITH SPRING-URGED PRESSURE PLATE

BACKGROUND OF THE INVENTION

The present invention relates to an instant camera, and more particularly to an instant camera for use with an integral or mono-sheet type instant film.

FIELD OF THE INVENTION

As is well known in the art, in integral or monosheet type diffusion transfer film units (which are hereinafter referred to as film units for simplicity), an image-receiving sheet is assembled with a negative or photosensitive sheet in a single unit. The film unit is provided at one end with a rupturable pod containing a developing reagent and at the opposite end with a trapping member for trapping excess developing reagent. A number of such film units are stacked in a film pack. In this film pack there is a spring member made of thin steel sheet which forces a pressure plate to press the stack of film units from the back against an exposure frame of the film pack so as to place the foremost film unit in the focal plane of the instant camera and to maintain it flat.

In instant cameras for use with such film packs, after exposure, a built-in motor starts its rotation so as to control sequentially the film processing operation. Specifically, at first, when the foremost film unit is exposed, the built-in motor starts its rotation to cause a single back and forth movement of a claw, and a continuous rotation of a pair of juxtaposed processing rollers through a gear train. The claw pushes the foremost film unit from its rear end and brings it into engagement with the rotating processing rollers. The processing rollers grasp the film unit between them and withdraw it from the film pack, thereby breaking the pod to release the developing reagent and to spread it between the image-receiving and photosensitive sheets of the film unit. As the pressure plate presses the stack of film units against the exposure frame of the film pack, the next film unit is placed in the focal plane. During the withdrawal of the foremost film unit, a shutter mechanism is set by the gear train for the next exposure. When the foremost film is fully withdrawn from the camera, the motor stops, which terminates the sequential control of processing operation.

Meanwhile, as described above, because the spring member presses the stack of film units against the front wall of the film pack formed with an exposure opening, by means of the pressure plate, the film units are subjected to a considerable friction force when withdrawn from the film pack. Therefore, the motors built into the instant cameras for use with such film packs need to generate high torque for smooth withdrawal of the film units.

OBJECT OF THE INVENTION

It is, therefore, an object of the present invention to provide an instant camera which can reduce the friction force exerted on a film unit by the front wall of the film pack when the film unit is withdrawn from the film pack.

SUMMARY OF THE INVENTION

The above and other objects of the present invention can be achieved by providing an instant camera which is provided with pressure relieving means for reversely urging a compression spring member connected to a pressure plate during withdrawal of the film units. The pressure relieving means is actuated as a result of the completion of exposure, to reversely urge the compression spring member so as to move back slightly the pressure plate, thereby relaxing the compression of the stack of film units. Owing to this relaxation of the compression of the stack of film units, a great reduction of friction force is achieved between the foremost film unit and the front wall of the film pack, thereby allowing the foremost film to be withdrawn much more easily from the film pack.

According to a preferred embodiment of the present invention, the pressure relieving means includes a solenoid and a protuberant plunger incorporated in the solenoid. This solenoid is energized upon the completion of exposure to extend the plunger so as to move back the pressure plate against the action of the compression spring member. Upon the exposed film unit being fully withdrawn from the film pack, the solenoid is deenergized, allowing the spring member once more to press the pressure plate against the stack of film units from behind.

BRIEF DESCRIPTION OF THE DRAWINGS

The present invention will become more apparent from the following detailed description taken in conjunction with a preferred embodiment thereof with reference to the accompanying drawings, in which.

DETAILED DESCRIPTION OF THE INVENTION

Figure 1:
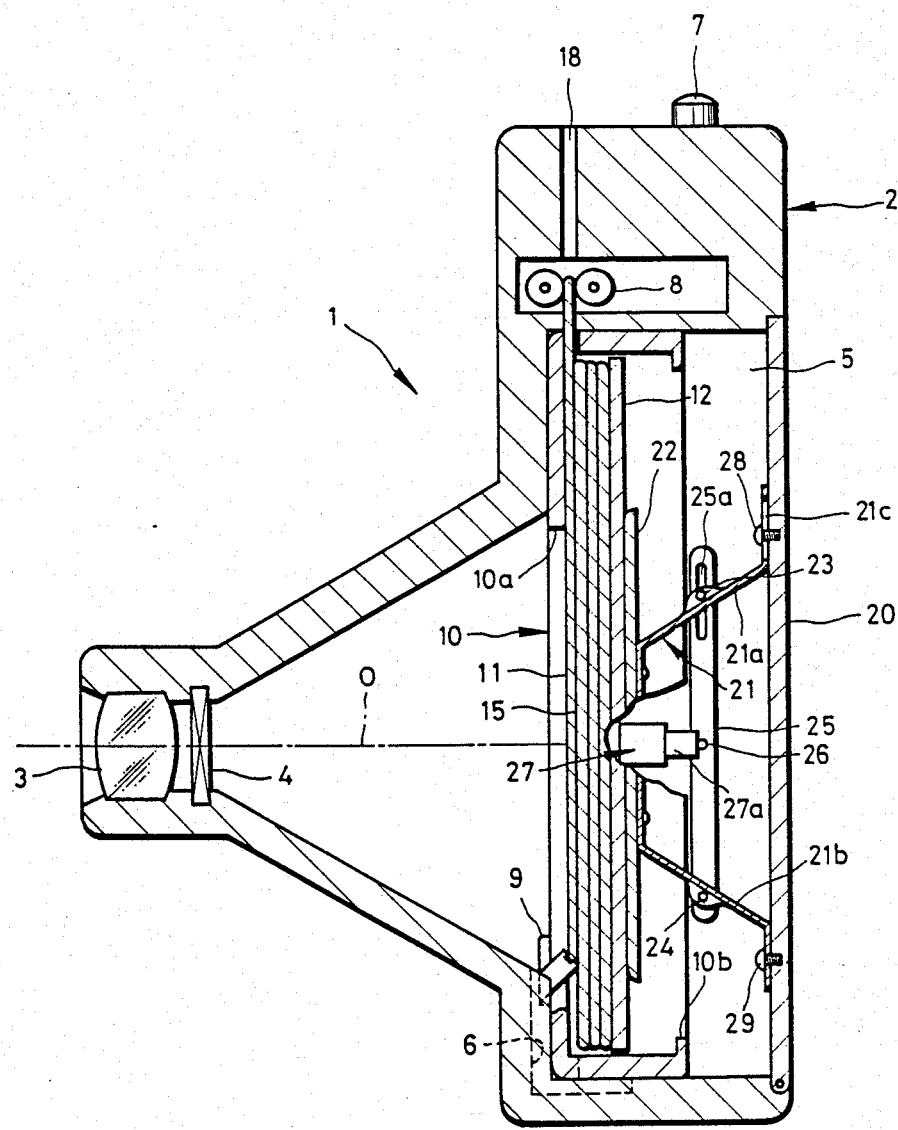
FIG. 1 is a cross sectional view of an instant camera embodying the present invention.

Referring now to FIG. 1, shown therein is an instant camera according to the present invention. As shown, the instant camera has a camera housing 2 with an objective lens 3 and a shutter unit 4 including an aperture. Behind the shutter unit 4, there is a film pack receiving chamber 5 with a back cover 20. After loading a film pack 10 into the film pack receiving chamber 5 of the camera housing, the back cover 20 is manually closed so as to maintain the inside of the camera housing 2 light-tight. The back cover 20 is provided with a pressure plate 22 attached to the inner surface thereof through a spring member 21 such as a leaf spring The spring member 21, which is made of resilient thin steel sheet, has integrally formed resilient arms 21a and 21b on the opposite sides thereof. In one of the arms 21a and 21b, for example the arm 21a, there is formed a slot-like opening 21c in which a headed pin 28 on the back cover 20 is slidably receiving for guiding and limiting relative movement of the spring 21a. On the other hand, the other arm 21b is secured to the back cover 20 by means of a set screw 29. Owing to the provision of the spring-supported pressure plate 22, a stack of a plurality of film units is urged in a direction parallel to the optical axis 0 of the lens 3, so that the foremost film unit 11 is always pressed against a front wall of the film pack 10 in which is provided an exposure frame formed by an exposure opening 10a.

In association with the spring member 21 there are provided a pair of pressure relieving means (one of which is shown) on opposite sides of the arms 21a and 21b. The pressure relieving means comprising an elongated lever 25 and a solenoid 27 with a protuberant plunger 27a and their associated elements. At the middle of each arm 21a, 21b there is a pin 23, 24. The elongated lever 25 is mounted by pin 24 on the arm 21b for swinging movement. In the end portion of lever 25 opposite the end at which the lever 25 is mounted on the arm 21b, lever 25 is formed with a slot 25a in which is engaged the pin 23 of the arm 21a so as to allow the elongated lever 25 to swing about the pin 24 of the arm 21b.

The elongated lever 25 is provided at its middle with a pin 26. Facing the pin 26 of the elongated lever 25, the solenoid 27 having the protuberant plunger 27a is attached to a side wall of the film package receiving chamber 5 of the camera housing 2. This solenoid 27 is energized to extend the plunger 27a immediately before the foremost film unit 11 is withdrawn from the film pack 10 so as to abut and push against the pin 26 of the lever 25. As a result the pressure plate 22 is moved slightly back, thereby reducing the pressure exerted on the stack of film units in the film pack by the pressure plate 22, thereby to reduce the pressure on the foremost film unit 11.

The solenoid 27 is deenergized to retract the plunger 27a except when the foremost film unit 11 is being removed, thereby allowing the pressure plate 22 to exert pressure on the stack of film units.

There is another pressure relieving means (not shown) disposed on the opposite side of the spring member 21, which is the same in construction and function as that described above, and so no detailed description will be needed. Owing to the provision of the pair of the pressure relieving means, the pressure plate 22 is held flat and perpendicular to the optical axis 0, even when being moved back against the action of the spring member 21.

Adjacent to a film exit slot 18 there is a pair of processing rollers 8 operationally coupled by a gear train 32 to a motor 33 (see FIG. 2) disposed in the camera housing 2. After exposure, the foremost film unit 11 is initially partially expelled by the claw 9 which, as is well known to those skilled in the art, is movably provided in a space 6 in the camera housing and extends into the film pack 10 so as to engage the rear end of the foremost film unit 11. When the claw 9 thus partially expels the foremost film unit 11, the pair of processing rollers 8 grasps the foremost film unit 11 between them. Because the processing rollers 8 continuously rotate, the processing rollers 8 expel the film unit 11 through the outlet slot 18, applying pressure to the film unit 11 the while.

As is well known in the art, when the leading end of the film unit 11 passes between the processing rollers 8, a pod containing developing reagent (not shown) attached to the end of the film unit 11 is ruptured to release a developing reagent between the image receiving and photosensitive sheets of the film unit 11. As the film unit 11 passes through the processing rollers 8, the released developing reagent is spread and distributed in a uniform layer between the image receiving and photosensitive sheets. A final image is formed on the image receiving sheet after the lapse of a predetermined number of seconds.

In the front wall of the film pack 10 there is formed the exposure opening 10a which is closed by a removable front cover plate (not shown) made of a black light-opaque plastic sheet material for preventing light entering the film pack 10. After loading the film pack 10 in the film pack receiving chamber 5 of the camera housing 2, the front cover plate is removed from the film pack 10 and from the camera through the film outlet slot 18 in the same manner as the film units 11, as a result of the operation of a shutter release member 7. By removing the front cover plate, the top film unit in the stack is made ready for exposure.

On the other hand, the film pack 10 is formed with an opening 10b at the bottom for allowing the pressure plate 22 disposed in the film pack receiving chamber 5 to be brought into contact with the stack of film units in the film pack 10. For preventing the film units contained in the film pack 10 from being exposed to light before the film pack 10 is loaded in the camera 1, the bottom opening 10b is closed by a back cover plate 12 made of a black plastic light-opaque sheet material which is disposed inside the film pack 10 so as to maintain the interior of the film pack 10 light-tight. When the film pack 10 is loaded in the film pack receiving chamber 5 of the camera housing 2, the pressure plate 22 bears against the back cover plate 12 so as to press the stack of film units toward the lens 3 along the axis 0 thereof, thereby pressing the foremost film unit 11 against the front exposure frame of the film pack 10.

Figure 2:
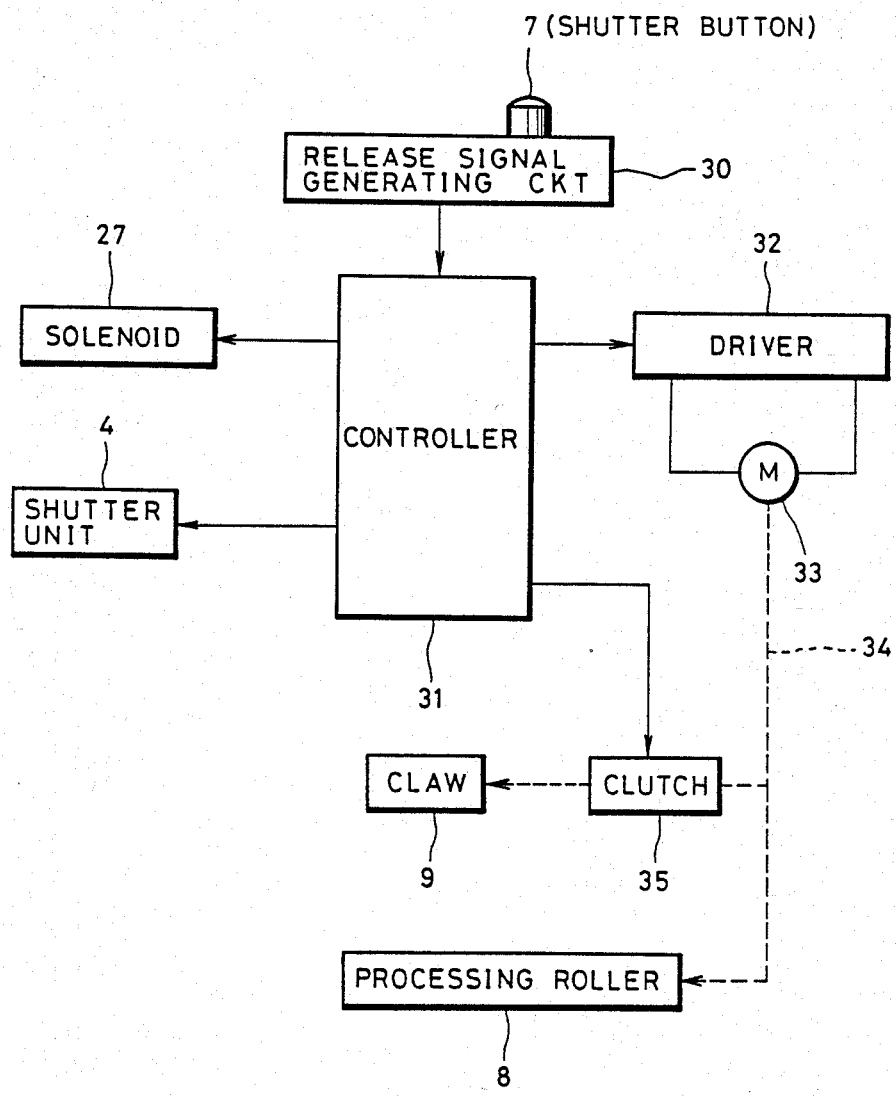
FIG. 2 is a block diagram showing a control circuit incorporated in the instant camera of FIG. 1.

Referring now to FIG. 2 for a detailed description of the operation of the instant camera described above, when the shutter release button 7 is depressed, a shutter release signal is provided by the shutter release signal generating circuit 30. A controller 31 receives the shutter release signal and actuates the shutter unit 4, with its associated elements, to open and close so as to effect a proper exposure of the foremost film unit 11. Following the completion of the exposure of the foremost film unit 11, the controller 31 causes the solenoid 27 to extend the plunger 27a so as to push back the pin 26 of the lever 25, moving rearwardly the lever 25 and hence the pressure plate 22. As a result, pressure is relieved from the back cover plate 12, thereby reducing or even eliminating the compression in the stack of film units. Thereafter, the controller 31 actuates the driver 32 to start the rotation of the motor 33 so as to operate the claw 9 and the processing rollers 8 through the gear train 34.

The claw 9 expels the exposed film unit 1 to bring it into engagement with the processing rollers 8. While the processing rollers 8 grasp and then advance the film unit 11 for processing, the claw 9 is swung back. Between the claw 9 and the gear train 34 there is a clutch mechanism 35 for disabling the claw 9 until the film unit 11 is fully advanced out of the film pack 10. During the advance of the film unit 11 by the processing rollers 8, the developing reagent released from the pod is spread and distributed between the image receiving and photosensitive sheets of the film unit 11 in a thin uniform layer so as to form a positive image on the image receiving sheet by a conventional diffusion transfer process. During the rotation of the processing rollers 8, the shutter unit 4 is made ready for the next exposure by means of the gear train 34. Simultaneously, the solenoid 27 is deenergized to retract the plunger 27a, allowing the pressure plate 22 to press against the back cover plate 12 in the film pack 10 so as to press the next film unit 15 against the exposure aperture frame. Thus the camera is made ready for the next exposure.

What is claimed is:

1. An instant camera with a back cover for allowing a film pack containing a stack of instant film units to be loaded in said camera, said film pack being of the type having an exposure opening in its front wall and a bottom opening in its rear wall, said instant camera comprising:

urging means attached to said back cover of said instant camera and adapted to contact a said stack of instant film units through said opening in said back wall of a said film pack for urging said stack of film units in a direction to bring the foremost instant film unit of said stack of instant film units into contact with said front wall of a said film pack; and pressure relieving means for moving back said urging means so as to relieve pressure on said stack of instant film units when said foremost instant film unit is being withdrawn from said film pack, thereby allowing said foremost film unit to be withdrawn with reduced friction.

2. An instant camera as defined in claim 1, wherein said urging means comprises a pressure plate and spring means attached to said back cover for pressing said pressure plate against a said stack of instant film units when said back cover is closed.

3. An instant camera as defined in claim 1, wherein said pressure relieving means comprises a pair of electromagnetic means each of which includes a solenoid and a protuberant plunger actuated by said solenoid and acting on said urging means.

4. An instant camera with a back cover for allowing a film pack containing a stack of instant film units to be loaded in said camera, said film pack being of the type having an exposure opening in its front wall and a bottom opening in its rear wall, said camera comprising:

spring means attached to said back cover;

a pressure plate supported by said spring means so as to press against said stack of instant film units in said film pack in order to bring the foremost instant film unit of said stack of instant film units into contact with said front wall of said film pack when said back cover is closed; and pressure relieving means coacting with said spring means for relieving pressure exerted on said stack of instant film units by said pressure plate, said pressure relieving means comprising:

an abutment member bearing against said spring member;

a solenoid with a protuberant plunger attached to the inside of said camera; and means for energizing said solenoid to extend said plunger so as to push against said abutment member in order to move said pressure plate rearwardly immediately after the exposure of said foremost instant film unit and for deenergizing said solenoid to retract said plunger so as to allow said pressure plate to press with increased force on said stack of instant film units when said foremost instant film unit has been withdrawn from said film pack.

* * * * *